Y. WANG.
COMPUTING INSTRUMENT.
APPLICATION FILED JAN. 19, 1915.
1,160,798.
Patented Nov. 16, 1915.
3 SHEETS—SHEET 1.
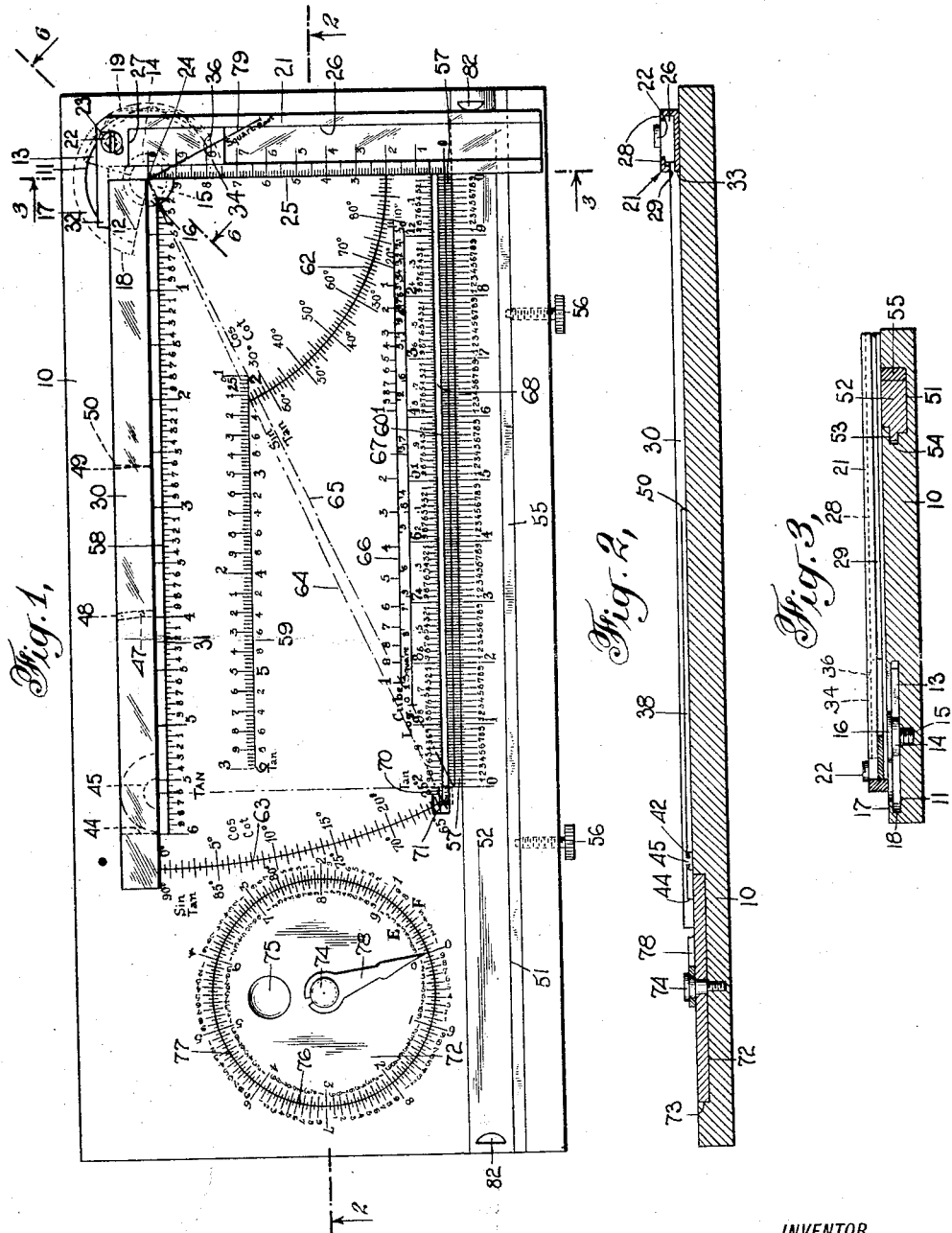
WITNESSES:
INVENTOR
Yu Wang
BY
ATTORNEYS

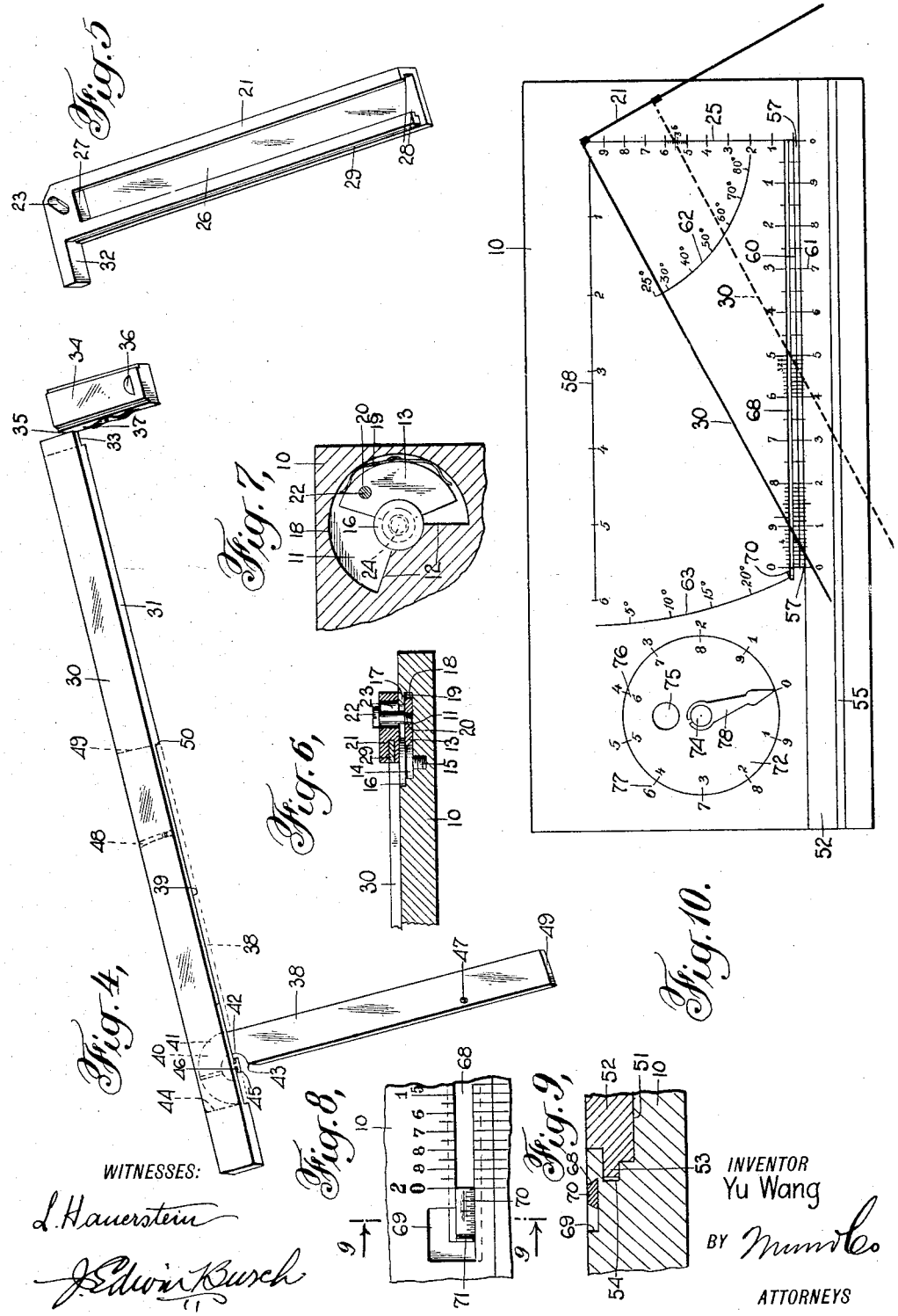

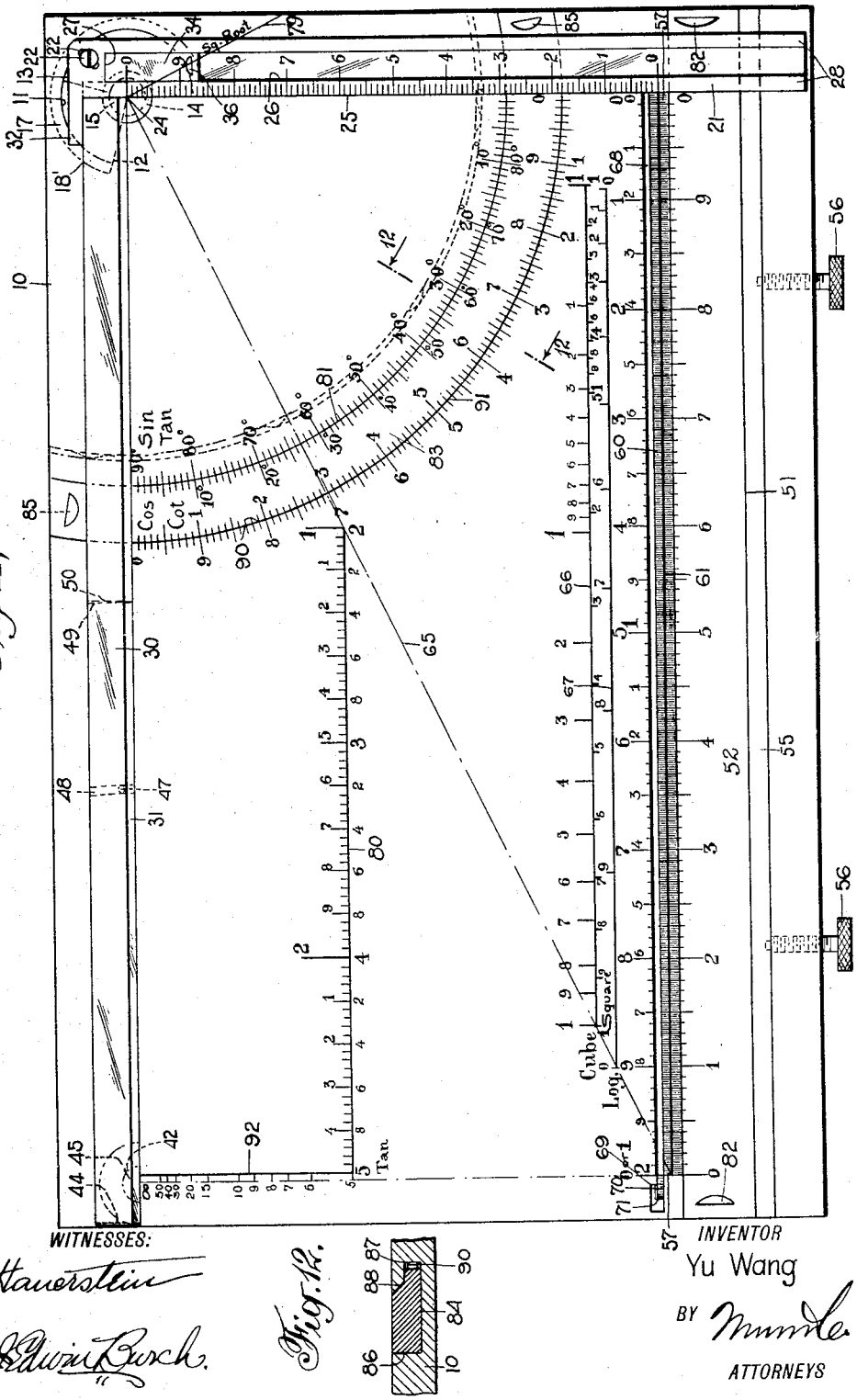

UNITED STATES PATENT OFFICE.

YU WANG, OF NEW YORK, N. Y.

COMPUTING INSTRUMENT.

1,160,798. Specification of Letters Patent. Patented Nov. 16, 1915.

Application filed January 19, 1915. Serial No. 3,062.

*To all whom it may concern:*

Be it known that I, YU WANG, a citizen of China, and a resident of the city of New York, borough of Manhattan, in the county and State of New York, have invented a new and Improved Computing Instrument, of which the following is a full, clear, and exact description.

The invention relates to a computing instrument utilizing various coöperating scales for determining numerical values of algebraic and transcendental functions.

The instrument is characterized by the provision of two intersecting scales having a common zero point, a computing member pivotally connected to the end of one scale and adapted to swing over the second scale, other scales disposed parallelly to said second scale and adapted to coöperate with the two intersecting scales, and circular scales the center of which is the pivot of the computing member, said computing member being adapted to swing over said parallel and circular scales.

The object of the invention is to provide an instrument which is simple, efficient and inexpensive, which is relatively flat, and whereby one can read directly from the scales the numerical values of algebraic and transcendental functions.

With the above and other objects in view, the invention resides in the peculiar combination and arrangement of parts to be hereinafter more fully described, illustrated and claimed, it being also an object to provide a device which is simple in construction, durable and efficient in operation and not likely to get out of working order.

Reference is to be had to the accompanying drawings forming a part of this specification, in which similar characters of reference indicate corresponding parts in all the views, and in which—

Figure 1 is a plan view of one form of the improved computing board; Fig. 2 is a longitudinal sectional view thereof taken on the line 2—2 of Fig. 1; Fig. 3 is a vertical cross sectional view thereof taken on the line 3—3 of Fig. 1; Fig. 4 is a detail perspective view of the computing arm and its runner, the short or axial arm which is pivoted thereto being shown swung in operative position; Fig. 5 is a detail perspective view of the guide arm to show the computing arm is slidably connected to pivot therewith; Fig. 6 is a detail sectional view taken on the line 6—6 of Fig. 1; Fig. 7 is a fragmentary sectional view of one corner of the board illustrating the manner of pivotally supporting the guide arm, in addition to Fig. 6; Fig. 8 is a fragmentary plan view of a slidable indicator for coöperation with the markings or devices of the rectilinear scale with which the slide rule coöperates; Fig. 9 is a sectional view thereof taken on the line 9—9 of Fig. 8; Fig. 10 is a diagrammatic plan view illustrating the manner of making a calculation of multiplication; Fig. 11 is a plan view of another form of my improved computing board; Fig. 12 is a sectional view thereof.

Referring to the drawings, 10 is a rectangular board having a sectorial recess 11 on one face adjacent the corner (see Fig. 7). The radial walls 12 of the recess form stops for a sectorial plate 13 which is provided with a sleeve 14 through which a pivot 15 passes. The pivot engages the board 10 and has an enlarged head 16 flush with the face of the board. The board has a flange 17 overhanging the curved wall of the recess 11 and the curved edge of the plate 13, to prevent vertical displacement of said plate when the same is secured in position by the pivot. A sinuous spring 18 is secured to the curved edge of the plate 13 to bear against the curved wall of the recess 11.

A guide arm 21 is secured pivotally to one corner of the plate 13 by a screw 22 which passes through an elongated, diagonally-disposed aperture 23 in the guide arm 21 (see Figs. 5 and 6). Thus, the guide arm is capable of bodily movement on the plate 13 and may be adjusted independently of the sector plate, which constitutes a hinge or pivot for the arm 21.

The guide arm 21 is longitudinally grooved as shown at 26, the groove communicating with the free end of the arm and terminating short of the other end of the arm to provide an end wall 27. This groove is under-cut by reason of the overhanging parts 28 which serve to restrict or render narrower the upper portion of the groove 26 which communicates with the inner edge of the guide arm through a slot 29, the arm being made of transparent material, such as celluloid.

A computing arm 30 of transparent material has an under-cut or reduced end 35 fitted to slide in a longitudinal slot 29 provided in the guide arm 21. A runner 34 is secured to the end 35 to fit a groove 26 of the arm 21 whereby the computing arm 30 is maintained at the same angles to the guide arm 21, while it is adjustable longitudinally of the said arm 21. A sinuous spring 37 is preferably interposed between the runner 36 and a wall of the groove 26 to offer a resistance to the movement of the runner.

The computing arm 30 carries an auxiliary arm 38 pivotally connected to the computing arm and designed to move into and out of a recess 39 in the bottom thereof. The short arm 38 is provided with a semicircular end 40, the small arc of which is beveled, as shown at 43, to fit the under-cut of the circular recess 45 formed in the arm 30. The arm 38 has a pin 47 adapted to engage a depression 48 in the computing arm 30, whereby it is prevented from accidental displacement when folded against the arm, although the arm 38 can swing to each side of the arm 30 due to the fact that the small arc is three-fourths of a circle.

Intersecting the scale 25 is a scale 60. As shown in the drawing, the two scales are at right angles. The intersection of the two scales is the zero of the scales. The scale 25 extends from the intersection to the pivot 15 and is divided decimally therebetween. Therefore it will be noted that the computing arm is pivotally connected at the end of the scale 25 and is adapted to swing over the scale 60, which is also divided decimally. The scale 60 is the main scale of the instrument, which is the center of all calculations. Coöperating with the scale 60 is an equal decimal scale 61 provided on a slide 52 mounted within the board, the scales 60 and 61 forming a slide rule. The slide 52 is mounted in the board in the way slides are mounted in slide rules. The reading of the scale 60 and of the scale 61 are oppositely directed.

Disposed parallelly to the main scale 60 are cubic and square scales 66 which are included between the scale 25 and the line 65, joining the end of the scale 60 with the axis of the pivot 15, line 65 being the trace of the measuring edge 31 of the computing arm 30 when the same is swung to register with the end of scale 60. It will be noted that the end of the 10th division of the scales 66 is on the said line 65. A logarithmic scale 67, also disposed parallel to the main scale 60, is provided on the instrument, and the end of the 10th division thereof is also located in the line 65. It will be noted that in the cubic, square and logarithmic scales, although decimally divided, the units are not of uniform length, as the measuring edge 31 when intersecting the scale 60, as, for example, at 2, will indicate 4 on the scale of squares, 8 on the scale of cubes, and .30 on the scale of logarithms.

It may be remarked that the cubic and square scales may be separated, and not combined as shown in the drawing, if so desired.

A circular scale 62 is provided on the board, the center of which is in the pivot of the arms. This scale 62 is subdivided into degrees to indicate the angle which the computing arm makes with the scale 25. To make the reading more exact, the upper portion of the scale 62 is swung with a greater radius, which terminates on the same radial line where the scale 62 terminates; so that the scale 63, in reality, is a continuation of the scale 62. The two scales 62 and 63 form a quadrant. When a tangent of an angle to be read is within the scale 62, the tangent will be read on the scale 60. If the angle is within the scale 63, the computing edge will lie outside of the scale 60, as the scale is not long enough. To permit the reading, a scale 58 parallel to the scale 60 is provided, which is decimal but the units of which are proportional to the units of the scale 60, and the original of which scale, of the zero, so to say, is on the scale 25. To further facilitate the reading of the tangents, a scale 59 parallel to the scale 60 is provided between the scales 58 and 60 and which is also decimal and the zero of which is also on the scale 25, and the units are necessarily proportional to the units of the scale 60.

The sine and cosine of the angles are read by means of the short arm 38 which is swung so as to be perpendicular to the scale 60 when the desired angle on the scale 62 or 63 has been intersected. It will be noted that the angles of the cosine and co-tangents are read on the scales 62 and 63 in a direction opposite to the reading of the sines and tangents.

The theory of the trigonometric functions or ratios of the sides of a triangle, it being known that the sides and angles of a triangle are mutually dependent, is employed in carrying out the calculations, the numerical value of any one of these functions or ratios depending upon the magnitude of the angle alone and independent of the lengths of the sides of the triangle, so that a constant ratio exists in triangles of similar angles. Thus, in a given triangle, as for instance, a triangle erected by the construction line 65 with the scales 25 and 60, if one of the sides is designated $b$ and by the theory employed in my device let the other side have a numerical value of 1 or any decimal multiple of 1, and a line is drawn from the first side to the second and parallel to the third side, this line will cut off lengths on the first two sides which bear a constant ratio as that which exists between said sides, this ratio constituting a trigonometric function of the included angle which will vary with the angle. By geometry, a line parallel to one side of a triangle divides the other two sides proportionately. That is, if one division covers a distance $a$, two divisions will cover a distance $2^a$ if the lines are parallel. Reversely, if one division covers a distance $1^a$, one-half of a division will cover a distance $1/2^a$. Thus, if the length cut off on the side $b$ be designated $c$ and the length cut off on the side having the numerical value of 1 be designated $a$, then the ratio $1:b::a:c$ exists, and this ratio is true of any line cutting off distances as specified as long as that line is parallel to the third side. Thus, $$c = b \times a, \quad b = \frac{a}{c}$$

and $$c = a \times b.$$

These ratios will be made use of in multiplication and division work or calculations, and are obtained by the displacement of the computing arm 30 on the arm 21; and if through that displacement the arm 21 is maintained fixed, the trace of the computing edges of the arm 30 will be parallel, as indicated in Fig. 10.

Longitudinally of the scale 60 and intersecting the division thereof is a dove-tailed groove 68 into which an indicator 70 is fitted, and which indicator has a grasping portion 71 to facilitate its manipulation and whereby the same can be moved to any point on the scale 60.

At the left hand end of the board beyond the angular scale portion 63 is a circular rule 72 which is mounted in a circular recess or depression 73 and adapted to turn on a pivot which may be in the form of a screw 74. This circular rule is designed to be turned by hand, a finger depression 75 being provided in the face thereof for this purpose, and the surrounding or circumferential edge of the circular rule or disk is provided with a scale 76 coöperating with a reversely enumerated scale 77 on the face of the board at the edge of the recess or depression 73, both of these scales being graduated or divided into uniform or regular divisions similarly corresponding to the other scales with the exception of the scale 25. An indicator hand or pointer 78 is loosely mounted on the pivot 74 above the circular rule or disk 72 to coöperate with the scale divisions for retaining a particular marking or division so that desired coincidence of the markings or divisions on the circular rule or disk, that is, of the scale 76 and those of the scale 77, may be quickly effected. These scales are used particularly for addition and subtraction for numbers larger than 1,000 as a sum or subtrahend. From 1,000 up the zero line of the circular rule on the scale indicates that the numeral 1 is to proceed the sum or subtrahend, so that the proper value will be given.

The operations of the computer are as follows:—

1. Add 543 and 398. Draw the slide rule until its 543rd division opposes the 398th division of the scale 60, then read on said scale the number indicated by the division which alines with the zero of the scale 61. It will be observed that it will appear slightly in advance of the numerical division 4, and if the graduations are fine or the vernier indicator is conjunctively used, it will readily give the reading 941.

2. Subtract 385 from 789. Draw the rule until its zero line opposes the 789th division on the scale 60 and then read at the 385th division of the rule or scale 61, the division on the scale 60 opposite thereto.

As the scale 60 is the center of all calculations and readings, hereafter an unspecified division means the division on the scale 60.

3. Multiply 945 by 56. Revolve the grooved arm until the lower edge of the computing arm cuts the 945th division, as shown in solid lines in Fig. 10. Move the runner down until the same edge cuts the 56th division on the scale 25, as indicated by dotted lines in said figure, and then read the division cut by the same edge. It will be observed that this line intersects about .9 of the division 3 on the left of the large division 5. The approximate answer is 52,900.

4. Divide 548 by 96. Revolve the grooved arm until the computing arm cuts the 96th division. Then move the runner until the same cuts the 548th division on the scale 60 and then read on said scale the point of intersection of the computing arm therewith. In lieu of this method the computing arm may be set to cut the 96th or the 960th division on the scale 25 and the 548th division on the scale 60, the reading being effected on the scale 60, at the division cut by the computing arm when the runner returns to its ordinary position. In the event that the first digit of the divisor is smaller than the dividend, the latter method is recommended.

5. Find sine X. Separate and draw the short arm which is under the computing arm until the computing arm cuts X, which may be any angle on the outside portion of the angular scale, and read the division when the short arm is parallel to the division line. Thus, if the sine of 90° is to be determined, said arm will be dropped from the computing arm perpendicularly to the scale 60, which will indicate the sine of 90° as 1. If said arm be dropped perpendicularly from X equal to 85°, the sine thereof will be found to be .99+.

6. Find cosine Y. Use the inner markings on the angular measure and with an angle of known degrees drop the short arm perpendicularly to the scale 60 and read the division cut thereby when the short arm is parallel to the division line.

7. Find tangent X. Revolve the grooved arm until the computing arm cuts the outer portion of the angular measure and by way of example let X equal 85°. The computing arm will then be said to cut the 85th degree mark on the angular measure and the result will be read on the tangent scale 58 at the point of intersection of the measuring edge of the computing arm therewith, which will be found to be 11+.

8. Find co-tangent X. Use the inner markings of the angular measure and treat as stated in example 7.

9. Add cosine X and .629. Swing the short or auxiliary arm 38 parallel with the division line of the scale 60 when the computing arm cuts X, which may be any given angle. Move the slide rule 52 until the 629th division thereof meets the division on the scale 60 cut by the short arm, and then read at the zero line of the rule the division on the scale 60 coincident therewith.

10. Divide sine X by cosine Y. Push or slide the indicator 70 to the cut of the short arm representing the value of cosine Y, and the zero of the rule to the cut of the short arm representing the value of sine X. Revolve the grooved arm until the computing arm cuts the division of the scale 60 where the indicator is and move the runner until the same cuts the scale 60 where the zero line of the rule is. The result may then be read on the scale 25 at the point where the computing arm cuts or intersects it.

11. Without any intermediate reading and resetting, find $$\frac{a + (b \div (\cos. Y - 9))}{d - 42 \sin X}.$$

Move the short arm to represent cosine Y and the zero line of the rule to the intersection. Revolve the computing arm to 9 on the rule, move the runner until the computing arm cuts $b$ on the scale 25 and division $a$ of the rule to the intersection of the computing arm on the scale 60, then move the indicator to the zero line on the rule. Use the short arm to obtain and represent sine X; move the zero line of the rule thereto; revolve the computing arm until it cuts the zero line intersection on the scale 60 and then move the runner to make the arm cut 42 on the scale 25 and push the zero line of the rule to the new intersection. Revolve the computing arm until it cuts the zero line intersection and move the runner until the same arm cuts the indicator division of the scale 60, so that the answer may be read on the scale 25.

12. Find log. 345. Swing the computing arm to cut the 345th division of the main scale and read the division cut by the same edge of the computing arm on the logarithmic scale. Prefix 2 as its characteristic, it being understood that every logarithm consists of two parts, that is, a positive or negative integral number which is called the characteristic and a positive proper fraction which is called a mantissa, so that according to the natural number whose logarithmic value is to be ascertained, the characteristic of that number must be fixed.

13. Find log. sin. X. Obtain the numerical equivalent of the sine value by the short arm and move the indicator thereto. Return the short arm and swing the computing arm to the division on the indicator and read on the logarithm scale. Prefix $-1$ or $-2$ as its characteristic, depending upon the size of the number.

14. Find log. cos. X. Treat as in the previous example but use the inner marking of the angular scale or measure in lieu of the outer marking or portion.

15. Find log. tan. X. ($>62°+$). Obtain the natural tangent of X and move the indicator to the numerical equivalent thereof on the main scale. This equivalent is twice as long as the tangent value measured from the origin in this design or form of device, which is the point of coincidence between the scales 25 and 60. Move the computing arm to cut or intersect the division of the scale 60 where the indicator is located and read on the logarithmic scale the division representing the number, prefixing the characteristic 1 thereto.

16. Find log. cot. X. Use the inner markings of the angular measure and treat as stated in the preceding case or example. Find sin. $^2$X; sin. $^3$X. Find sin. $^2$X; cos. $^3$X. Find tan. $^2$X; tan. $^3$X. These examples can be done in the same manner through the main scale which serves as a medium.

17. Find log. log. or $(X^m)^n$. Find logarithmic value of a number and put this value on the main scale by use of the indicator and then find the logarithmic value of this number.

18. To raise powers or extract roots of a number, say ($X^{25}$) first find log. X and put the log. number to the proper characteristic affixed, on the main scale. Multiply by 25 as in usual multiplication and put the product thus obtained, eliminating its characteristic, on the logarithm scale by the edge of the computing arm, and read on the main scale the point cut by the computing arm or the point of intersection of the latter therewith. Fix the decimal point by the eliminated characteristic. The same method may be used for extracting the cube and square roots, as for instance, to extract $\sqrt[25]{X}$ except that in this case the principles of operation used in division are employed and treated as in foregoing examples.

19. Find tan. (53° 30′—29° 29′). Move the zero line of the curved slide rule shown in Fig. 11 of the drawings to the 53° 30′ division and swing the computing arm to the 29° 29' division of the rule. Read the answer on the tangent scale.

20. Find sin. (54° 59'+25° 18'). Move the 25° 18' division of the curved rule to the 54° 59' on the board or corresponding scale thereof, swing the computing arm to the end of the scale of the rule and then use the short arm to obtain the sine.

21. Find cos. (X+XY) or (X—XY); cot. (X—Y) or (X+Y) or like examples. From the previous examples it is thought that the use and operation of the device is clear and it will be obvious that by means of this board practically all problems in arithmetic and trigonometry, especially where numbers and degrees are concerned, can be effected.

The advantage of a device of this kind is that the centralization of all calculations on one uniform scale and a double use of the slide rule, both as an indicator and calculator, not only facilitates the solution of problems of a complex nature, but also avoids many intermediate readings and settings. In this manner the answers of problems are quickly and directly found.

While the computing arm is shown at right angles to the guide arm, and this is the preferred form of the device, the essential feature is that the computing arm is slidably or adjustably secured to the guide arm to move in fixed angular relation thereto, so that the angle formed between the two is constant and, therefore, proportional parts are cut off from the scales 25 and 60.

In the form of the invention illustrated in Figs. 11 and 12 of the drawings, the structure is the same with the exception that a different scale arrangement is provided. The scales 25, 60, 61, 66 and 67 are the same and the scale 59 is replaced by a scale 80 except that the latter proceeds as high as 2.5 instead of 3. The scale 58 and the circular rule are omitted and the angular or arcuate scale, instead of being divided into inner and outer portions, is made in the form of a continuous scale 81 of 90° with its limits at the measuring edges of the guide and computing arms when the latter are in their normal positions. In lieu of the circular rule 72 an arcuate slide rule 83 is provided. In this instance as before, the measurements of the scale 60 are effected in conjunction with the lower portion of the angular scale whereas the measurements of the upper portion of the angular scale are effected in conjunction with the tangent scale 80. Furthermore, in lieu of the scale 58 with which very sharp angles are formed by the computing arm in the structure shown in Fig. 1, a vertical scale 92 is provided, the same branching upward at right angles to the scale 80 at the far or left hand extremity of the latter with its upper end terminating on a line parallel to scale 60 and passing through the pivot point 24. This scale is set off decimally in numerical values from the trigonometric functions of the angles formed by a straight line revolving in the pivot 24 and moving from the line at right angles to the scale 25 and passing through the pivot 24. The arcuate 83 is used for the subtraction and division of degrees, as well as natural numbers. In other words, if we are to subtract 326 from 541, the rule 83 is drawn out at the right hand edge until its zero line opposes the 541st division of the scale 91, and the reading is then taken at the 326th division of the rule on the scale 91. In subtracting 19° 39' from 28° 35' the rule 83 is similarly moved so that its zero line opposes the 29° 35' line or graduation of the scale 81 and then the reading is taken on this scale at the 19° 39' graduation of the rule. Thus, as the scale 92 proceeds up to 50 or more, fractional measurements between the decimal enumerations or graduations may be determined, as 11.43 will be found at a point between 10 and 15 which is a little less than 11.5, this degree of accuracy being sufficient in most cases.

From the above description it will be seen that in my computing instrument there are two intersecting scales, which have their origin or zero at the point of intersection, the two scales being divided into an equal number of parts. Pivotally connected to one of the scales is a computing member which is adapted to swing over the other scale, which is the main scale of the instrument. Coöperating with the main scale is a sliding scale of the same length and number of divisions but which reads in the opposite direction and whereby addition and subtraction are obtained on the instrument. The said computing member has means for intersecting proportional segments from the two intersecting scales, whereby multiplication and division are obtained on my instrument. Furthermore, coöperating with the main scale and disposed parallelly to said scale are scales of logarithms, squares and cubes, the values of which are determined on the main scale by means of the computing arm. The trigonometrical functions are also determined on the main scale or scales parallel thereto with which coöperates a circular scale giving the angles, and the center of which scale is in the pivot of the computing arm.

Having thus described my invention, what I claim as new and desire to secure by Letters Patent is:—

1. In a computing instrument of the class described, a pair of intersecting scales, a computing member pivotally connected to one scale and adapted to swing over the other scale, said computing member having means whereby proportional segments can be cut off from said intersecting scales and whereby multiplication and division are obtained on said instrument.

2. In a computing instrument of the class described, a pair of intersecting scales, a computing member pivotally connected to one scale and adapted to swing over the other scale, said computing member having means for cutting off sections on both scales that bear definite ratios to one another, and a scale of the same length and number of divisions as said other scale adapted to slide relative thereto.

3. In a computing instrument of the class described, two intersecting scales, said scales being decimally divided, a computing member pivotally connected to one scale and adapted to swing over the other, said other scale being the main scale, and other scales for indicating the algebraic and transcendental functions so divided and related to the main scale that the computing member intersecting any of said scales will give the numerical value of the function it intersects on the main scale, and vice versa.

4. In a computing instrument of the class described, two intersecting decimal scales having their origin or zero point at the intersection, a computing member pivotally connected to the end of one scale and adapted to swing over the other, which is the main scale, said computing member having means for cutting off sections on the intersecting scales that bear definite ratios to one another, and other scales for indicating the algebraic and transcendental functions, so divided and related to the main scale that the computing arm when intersecting any of said scales will give the numerical value of the function it intersects on the main scale, and vice versa.

5. In a computing instrument of the class described, two intersecting decimal scales having their origin or zero point at the intersection, a member pivotally connected to the end of one scale and adapted to swing over the other, which is the main scale, said member having an edge passing through the pivot and constituting the computing line of the instrument, said member having means for displacing the member without disturbing the angular relation of the member with the intersecting scales, and scales for indicating the algebraic and transcendental functions disposed parallel to the main scale and so divided and related thereto that the computing line, when intersecting any of said scales, will be given the numerical value of the function by intersection on the main scale, and vice versa.

6. In a computing instrument of the class described, two intersecting decimal scales having their origin or zero point at the intersection, a member pivotally connected to one scale and adapted to swing over the other, which is the main scale, said member having an edge passing through the pivot and constituting the computing line of the instrument, said member having means for displacing the member without disturbing the angular relation of the member with the intersecting scales and whereby any part of the main scale can be divided into segments proportional to the divisions of the first scale, scales for indicating the algebraic and transcendental functions disposed parallel to the main scale and so divided and related thereto that the computing line when intersecting any of said scales will give the numerical value of the function by intersection on the main scale, and vice versa, and a decimal scale of the same length as the main scale and slidably related thereto.

7. In a computing instrument of the class described, two intersecting decimal scales having their origin or zero point at the intersection, a member pivotally connected to one scale and adapted to swing over the other, which is the main scale, said member having an edge passing through the pivot, which constitutes the computing line of the instrument, said member having means for displacing the member so that a fixed angular relation of said edge with the scales remains undisturbed, and other scales for indicating the algebraic and transcendental functions disposed parallelly to the main scale and having one end thereof on the line joining the ends of the two intersecting scales and so divided and related to the main scale that the computing line when intersecting any of said scales will give the numerical value of the function it intersects on the main scale, and vice versa.

8. In a computing instrument of the class described, two intersecting decimal scales having their origin or zero point at the intersection, a member pivotally connected to the end of one scale and adapted to swing over the other, which is the main scale, said member having an edge passing through the pivot of the member, and which edge constitutes the computing line of the instrument, means associated with the member to displace it so that a fixed angular relation of said edge with the scales remains undisturbed, and other scales for indicating the algebraic and transcendental functions disposed parallel to the main scale and located within the first-mentioned scale and a line adjoining the extremities of the intersecting scales, said other scales being so divided and related to the main scale that a computing line, when intersecting any of said scales, will give the numerical value of the function it discloses on the main scale, and vice versa.

9. In a computing instrument of the class described, two intersecting scales having their origin or zero point at their intersection, said scales being decimally divided and each having uniform divisions, a member pivotally connected to the end of one scale and adapted to swing over the other, which is the main scale, said member having an edge passing through the pivot, and which edge constitutes the computing line of the instrument, and other decimal scales for indicating the algebraic and transcendental functions, the units of said last-mentioned decimal scales being of varying length, so that the computing line when intersecting any of said last-mentioned scales will give the numerical value of the function it intersects on the main scale, and vice versa, said member having means for displacing the member without disturbing its angular relation with the intersecting scales, whereby sections are cut off on the intersecting scales that bear definite ratios to one another.

10. In a computing instrument of the class described, two intersecting decimal scales having their origin or zero point at the intersection, each of said scales having divisions of uniform length, a member pivotally connected to the end of one scale and adapted to swing over the other, which is the main scale, said member having an edge passing through the pivot, and which edge constitutes the computing line of the instrument, means associated with the member for displacing it so that a fixed angular relation of the edge of the scales remains undisturbed, a slide having a decimal scale of the same length and divisions as the main scale coöperating therewith, and other decimal scales for indicating the algebraic and transcendental function disposed parallelly to the main scale and included between the scale intersecting the main scale and a line joining the extremities of the intersecting scales, one end of said scales for indicating the algebraic and transcendental functions being located on the line joining the extremities of the intersecting scales, the units of the said last-mentioned scales being not of uniform length but such that when the computing line intersects said scales, the numerical value of the function it intersects will be read on the main scale, and vice versa.

11. In a computing instrument of the class described, a pair of decimal scales intersecting at right angles, the origin or zero of which scales is at the point of intersection, a computing member pivotally connected to the end of one scale and adapted to swing over the other, which is the main scale, and decimal cubic, square and logarithmic scales disposed parallel to the main scale, one end of which scales is located on the line joining the extremities of the intersecting scales.

12. In a computing instrument of the class described, a pair of decimal scales intersecting at right angles with the origin or zero of the scales at the point of intersection, a computing member pivotally connected to one scale and adapted to swing over the other, which is the main scale, arcs, the centers of which are in the pivot of the computing member and which arcs are subdivided into degrees, the tangent and co-tangent of which arcs intersected by the computing member are readable directly on the main scale, a scale disposed parallelly to the main scale for reading the tangent and co-tagent of the arcs lying above a line joining the extremities of the intersecting scales, and means associated with the computing member for reading the sine and cosine of the arcs on the main scale.

13. In a computing instrument of the class described, a pair of decimal scales intersecting at right angles with the zero of the scales at the intersection, a computing member pivotally connected to the end of one scale and adapted to swing over the other, which is the main scale, decimal, cubic, square and logarithmic scales disposed parallel to the main scale and over which said computing member is adapted to swing, said last-mentioned scales having one end thereof located on the line joining the extremities of the intersecting scales and directed toward the scale on which the computing member is pivoted, the units of said cubic, square and logarithmic scales being of unequal length, such that when the computing member intersects said scales the numerical value of the function it intersects will be read upon the main scale, and vice versa, arcs, the centers of which are in the pivot of the computing member divided into degrees, a swinging member on the computing member for reading the sine and cosine on the main scale for any portion of the arc intersected by the computing member, the tangent and cotangent being readable on the main scale at the points where the computing member intersects the main scale, a scale parallel to the main scale for reading the tangent and cotangent for that part of the arc which lies above the line joining the ends of the intersecting scales, said computing member having means for cutting off segments on the intersecting scales that bear definite ratios to one another, and a scale of the same length and divisions as the main scale slidable relative thereto, substantially as and for the purpose set forth.

14. In a computing instrument of the class described, a pair of intersecting scales, a computing member pivotally connected to the end of one scale and adapted to swing over the other scale, said computing member having means for cutting off sections on the intersecting scales that bear definite ratios to one another, substantially as and for the purpose set forth.

15. In a computing instrument of the class described, a pair of intersecting scales the divisions of which scales extend from the point of intersection, a computing member pivotally connected to one scale and adapted to swing over the other scale, and means associated with the computing member whereby the same may be displaced over the intersecting scales without disturbing the angularity between the intersecting scales and the member.

16. In a computing instrument of the class described, a pair of intersecting scales, a computing member pivotally connected to one scale and adapted to swing over the other scale, a scale of the same length and number of divisions as said other scale adapted to slide relatively thereto, and an indicator mounted to travel along said other scale, substantially as and for the purpose set forth.

17. In a computing instrument of the class described, a pair of scales disposed angularly to one another, a computing member pivotally connected to one scale and adapted to swing over the other scale, and means for adjusting the pivotal point of the computing member on the scale, said computing member having means for cutting off sections on both scales that bear definite ratios to one another.

18. In a computing instrument of the class described, two scales disposed angularly to one another, a computing member pivotally connected to one scale and adapted to swing over the other, said other scale being the main scale, and other scales for indicating the algebraic and transcendental functions so divided and related to the main scale that the computing member intersecting any of said scales of functions will give the numerical value of the function it intersects on the main scale, and vice versa.

In testimony whereof I have signed my name to this specification in the presence of two subscribing witnesses.

YU WANG.

Witnesses:
JOHN E. BURCH,
PHILIP D. ROLLHAUS.

Copies of this patent may be obtained for five cents each, by addressing the "Commissioner of Patents, Washington, D. C."